US012779892B2

(12) United States Patent
Ishida et al.

(10) Patent No.: US 12,779,892 B2
(45) Date of Patent: Nov. 3, 2026

(54) HEAT TRANSFER SHEET AND COMBINATION OF HEAT TRANSFER SHEET AND INTERMEDIATE TRANSFER MEDIUM

(71) Applicant: Dai Nippon Printing Co., Ltd., Tokyo (JP)

(72) Inventors: Tadahiro Ishida, Tokyo (JP); Yoshihiro Imakura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 332 days.

(21) Appl. No.: 17/997,380

(22) PCT Filed: May 12, 2021

(86) PCT No.: PCT/JP2021/018065

§ 371 (c)(1),
(2) Date: Oct. 28, 2022

(87) PCT Pub. No.: WO2021/230290

PCT Pub. Date: Nov. 18, 2021

(65) Prior Publication Data

US 2023/0219358 A1 Jul. 13, 2023

(30) Foreign Application Priority Data

May 13, 2020 (JP) ................................ 2020-084317

(51) Int. Cl.
*B41M 5/382* (2006.01)
*B41M 5/44* (2006.01)

(52) U.S. Cl.
CPC .............. *B41M 5/382* (2013.01); *B41M 5/44* (2013.01); *B41M 2205/30* (2013.01); *B41M 2205/38* (2013.01)

(58) Field of Classification Search
CPC .... B41M 5/382; B41M 5/44; B41M 2205/30; B41M 2205/38
See application file for complete search history.

(56) References Cited

U.S. PATENT DOCUMENTS 6,040,268 A * 3/2000 Ueno .................. B41M 7/0027
503/227
7,745,065 B2 * 6/2010 Eto ..................... B42D 25/328
430/1
(Continued)

FOREIGN PATENT DOCUMENTS

EP 4 088 926 A1 11/2022
JP H06-328868 A * 11/1994
(Continued)

OTHER PUBLICATIONS

Machine Translation of JP H06-328868 A (Year: 1993).*
(Continued)

*Primary Examiner* — Sathavaram I Reddy
(74) *Attorney, Agent, or Firm* — Muncy, Geissler, Olds & Lowe, P.C.

(57) ABSTRACT

The present disclosure relates to a thermal transfer sheet including a first substrate and a first adhesive layer, in which the first adhesive layer is a layer to be transferred from the thermal transfer sheet by heating, and the first adhesive layer contains a crystalline polyester.

11 Claims, 3 Drawing Sheets

(56) References Cited

U.S. PATENT DOCUMENTS

| | | | | |
|---|---|---|---|---|
| 11,472,196 | B2 | 10/2022 | Yoda | |
| 2006/0275671 | A1 * | 12/2006 | Eto | B42D 25/328 430/1 |
| 2016/0248085 | A1 | 8/2016 | Umeyama et al. | |
| 2019/0232612 | A1 | 8/2019 | Minamikawa | |
| 2021/0001639 | A1 * | 1/2021 | Yoda | B41M 5/38264 |
| 2023/0022367 | A1 * | 1/2023 | Hirokawa | B32B 27/36 |

FOREIGN PATENT DOCUMENTS

| | | | | | |
|---|---|---|---|---|---|
| JP | 2000-293837 | A | | 10/2000 | |
| JP | 3117172 | B2 | * | 12/2000 | G03F 3/10 |
| JP | 2007-011319 | A | | 1/2007 | |
| JP | 2012-051213 | A | | 3/2012 | |
| JP | 2018-154100 | A | | 10/2018 | |
| JP | 2019064153 | A | * | 4/2019 | |
| JP | 2020-001225 | A | | 1/2020 | |
| WO | 2019/176323 | A1 | | 9/2019 | |

OTHER PUBLICATIONS

Machine Translation of JP 2012-051213 A (Year: 2012).*
Machine Translation of JP-3117172-B2 (Year: 2000).*
Machine Translation of JP-2019064153-A (Year: 2019).*
English translation of International Preliminary Report on Patentability (Chapter I) (Application No. PCT/JP2021/018065) dated Nov. 24, 2022.
International Search Report and Written Opinion (Application No. PCT/JP2021/018065) dated Jul. 20, 2021 (with English translation).
Korean Office Action (with English translation) dated Jun. 21, 2024 (Application No. 10-2022-7042471).
Extended European Search Report dated May 7, 2024 (Application No. 21803088.0).
Korean Office Action (with English translation) dated Aug. 28, 2025 (Application No. 10-2022-7042471).

* cited by examiner

HEAT TRANSFER SHEET AND COMBINATION OF HEAT TRANSFER SHEET AND INTERMEDIATE TRANSFER MEDIUM

TECHNICAL FIELD

The present disclosure relates to a thermal transfer sheet, a combination of the thermal transfer sheet and an intermediate transfer medium, a printed material, and a method for producing a printed material.

BACKGROUND ART

Hitherto, various printing methods have been known. Among them, a sublimation thermal transfer method enables density gradation to be freely adjusted, has excellent reproducibility of neutral colors and of gradation, and makes it possible to form high-quality images comparable to silver halide photographs.

The sublimation thermal transfer method is one in which a thermal transfer sheet including a sublimation transfer color material layer containing a sublimation dye and a thermal transfer image-receiving sheet including a receiving layer are superimposed on each other, and then the thermal transfer sheet is heated by a thermal head included in a printer to transfer the sublimation dye in the sublimation transfer coloring material layer to the receiving layer to form an image, thereby obtaining a printed material.

The production of printed materials by using combinations of such thermal transfer sheets and intermediate transfer media are widely practiced.

Specifically, first, a thermal transfer sheet and an intermediate transfer medium that includes a transfer layer are superimposed on each other. The thermal transfer sheet is heated to form an image on the transfer layer included in the intermediate transfer medium. The intermediate transfer medium and a transfer-receiving article are superimposed on each other. The intermediate transfer medium is heated to transfer the transfer layer, on which the image has been formed, onto the transfer-receiving article, thereby producing a printed material.

Moreover, after the formation of an image, an adhesive layer is formed on a surface of the transfer layer of the intermediate transfer medium, thereby improving the adhesion between the transfer layer and the transfer-receiving article.

The formation of the adhesive layer on the intermediate transfer medium is performed, for example, by transferring the adhesive layer from the thermal transfer sheet to the surface of the transfer layer of the intermediate transfer medium.

Such an adhesive layer is required to have high transferability to the surface of the transfer layer of the intermediate transfer medium after image formation (hereinafter referred to as primary transferability), high transferability of the transfer layer from the intermediate transfer medium to the transfer-receiving article (hereinafter referred to as secondary transferability), and high adhesion between the transfer layer and the transfer-receiving article.

SUMMARY OF INVENTION

Technical Problem

It is an object of the present disclosure to provide a thermal transfer sheet having excellent primary transferability and excellent secondary transferability and including an adhesive layer that can improve the adhesion between a transfer layer and a transfer-receiving article.

It is another object of the present disclosure to provide a combination of the thermal transfer sheet and an intermediate transfer medium.

It is another object of the present disclosure to provide a printed material produced by using the combination of the thermal transfer sheet and the intermediate transfer medium.

It is another object of the present disclosure to provide a method for producing the printed material.

Solution to Problem

A thermal transfer sheet of the present disclosure includes a first substrate and a first adhesive layer, in which the first adhesive layer is a layer to be transferred from the thermal transfer sheet by heating, and the first adhesive layer contains a crystalline polyester.

A combination of the present disclosure is a combination of the thermal transfer sheet described above and an intermediate transfer medium, in which the intermediate transfer medium includes a second substrate and a transfer layer including at least a receiving layer.

A printed material of the present disclosure is a printed material produced by using a combination of the thermal transfer sheet described above and an intermediate transfer medium, in which the intermediate transfer medium includes a second substrate and a transfer layer including at least a receiving layer, the printed material includes, in sequence, the transfer layer, an image formed on the receiving layer, the first adhesive layer, and a transfer-receiving article, and the image and the transfer-receiving article are in contact with the first adhesive layer.

A method for producing the above-described printed material of the present disclosure includes the steps of:

providing the combination of the thermal transfer sheet and the intermediate transfer medium;

forming the image on the receiving layer of the intermediate transfer medium;

transferring the first adhesive layer from the thermal transfer sheet onto the image; and transferring the transfer layer, the image, and the first adhesive layer from the intermediate transfer medium onto the transfer-receiving article.

A printed material of the present disclosure is a printed material produced by using a combination of the thermal transfer sheet described above and an intermediate transfer medium, in which the intermediate transfer medium includes a second substrate and a transfer layer including at least a receiving layer, the printed material includes, in sequence, the transfer layer, an image formed on the receiving layer, the first adhesive layer, the second adhesive layer, and a transfer-receiving article, and the image is in contact with the first adhesive layer, and the transfer-receiving article is in contact with the second adhesive layer.

A method for producing the printed material of the present disclosure includes the steps of:

providing the combination of the thermal transfer sheet and the intermediate transfer medium;

forming the image on the receiving layer of the intermediate transfer medium;

transferring the first adhesive layer and the second adhesive layer from the thermal transfer sheet onto the image; and transferring the transfer layer, the image, the first adhesive layer, and the second adhesive layer from the intermediate transfer medium onto the transfer-receiving article.

Advantageous Effects of Invention

According to the present disclosure, it is possible to provide the thermal transfer sheet having excellent primary transferability and excellent secondary transferability and including the adhesive layer that can improve the adhesion between the transfer layer and the transfer-receiving article.

According to the present disclosure, it is possible to provide the combination of the thermal transfer sheet and the intermediate transfer medium.

According to the present disclosure, it is possible to provide the printed material produced by using the combination of the thermal transfer sheet and the intermediate transfer medium.

According to the present disclosure, it is possible to provide the method for producing the printed material.

DESCRIPTION OF EMBODIMENTS

<Thermal Transfer Sheet>

A thermal transfer sheet of the present disclosure includes at least a first substrate and a first adhesive layer.

The thermal transfer sheet of the present disclosure will be described below with reference to the drawings.

Figure 1:
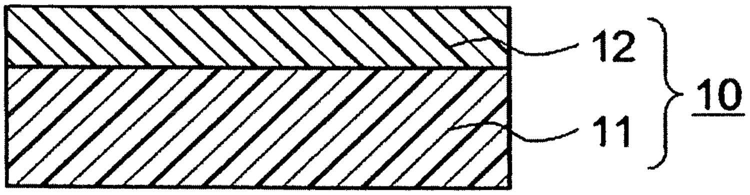
FIG. 1 is a schematic cross-sectional view illustrating a thermal transfer sheet according to an embodiment of the present disclosure.

In one embodiment, the thermal transfer sheet 10 includes a first substrate 11 and a first adhesive layer 12, as illustrated in FIG. 1.

Figure 2:
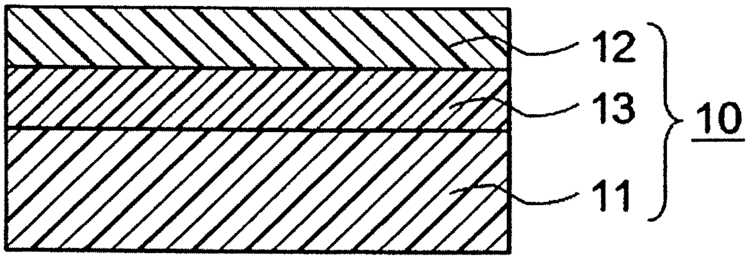
FIG. 2 is a schematic cross-sectional view illustrating a thermal transfer sheet according to an embodiment of the present disclosure.

In one embodiment, the thermal transfer sheet 10 includes a second adhesive layer 13 between the first substrate 11 and the first adhesive layer 12, as illustrated in FIG. 2. The thermal transfer sheet 10 may include a further optional layer (not illustrated) between the first adhesive layer 11 and the second adhesive layer 12.

Figure 3:
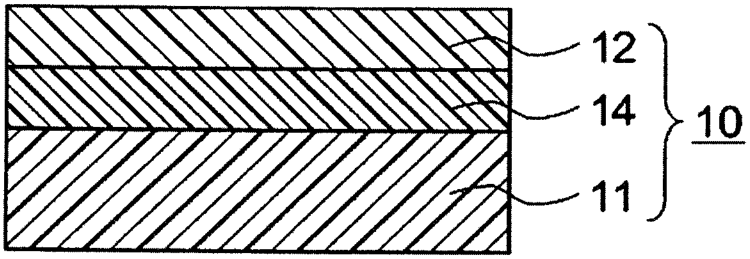
FIG. 3 is a schematic cross-sectional view illustrating a thermal transfer sheet according to an embodiment of the present disclosure.

In one embodiment, the thermal transfer sheet 10 includes a release layer 14 between the first substrate 11 and the first adhesive layer 12, as illustrated in FIG. 3.

Figure 4:
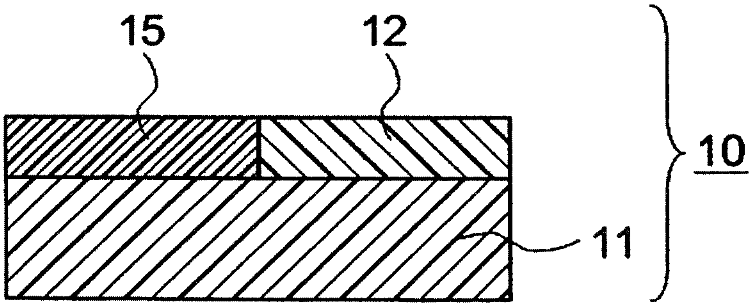
FIG. 4 is a schematic cross-sectional view illustrating a thermal transfer sheet according to an embodiment of the present disclosure.
Figure 5:
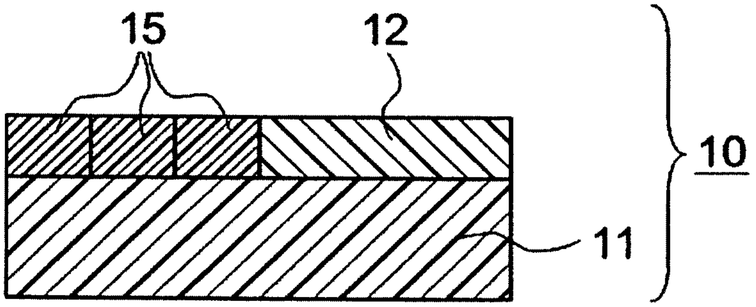
FIG. 5 is a schematic cross-sectional view illustrating a thermal transfer sheet according to an embodiment of the present disclosure.

In one embodiment, the thermal transfer sheet 10 includes a coloring material layer 15 and the first adhesive layer 12 that are disposed as being frame sequentially on the same surface of the first substrate 11, as illustrated in FIG. 4. Multiple coloring material layers 15 may be present. As illustrated in FIG. 5, the multiple coloring material layers 15 may be disposed as being frame sequentially on the same surface of the first substrate 11.

In one embodiment, the thermal transfer sheet 10 includes a back layer (not illustrated) on a side of the first substrate 11 opposite to the side on which the first adhesive layer 11 is disposed.

Each of the layers included in the thermal transfer sheet of the present disclosure will be described below.

(First Substrate)

The first substrate can be used without limitation as long as it has heat resistance to thermal energy applied during thermal transfer, mechanical strength that can support, for example, the first adhesive layer disposed on the first substrate, and solvent resistance.

As the first substrate, a film comprising a resin material (hereinafter, referred to simply as a "resin film") can be used. Examples of the resin material include polyesters, such as poly(ethylene terephthalate) (PET), poly(butylene terephthalate) (PBT), poly(ethylene naphthalate) (PEN), 1,4-poly (cyclohexylenedimethylene terephthalate), terephthalic acid-cyclohexanedimethanol-ethylene glycol copolymers; polyamides, such as nylon 6 and nylon 6,6; polyolefins, such as polyethylene (PE), polypropylene (PP), and polymethylpentene; vinyl resins, such as poly(vinyl chloride), poly (vinyl alcohol) (PVA), poly(vinyl acetate), vinyl chloride-vinyl acetate copolymers, poly(vinyl butyral), and poly (vinyl pyrrolidone) (PVP); (meth)acrylic resins, such as polyacrylate, polymethacrylate, and poly(methyl methacrylate); imide resins, such as polyimide and poly(ether imide); cellulose resins, such as cellophane, cellulose acetate, nitrocellulose, cellulose acetate propionate (CAP), and cellulose acetate butylate (CAB); styrene resins, such as polystyrene (PS); polycarbonate; and ionomer resins.

Among the resin materials described above, polyesters, such as PET and PEN, are preferable, and PET is particularly preferable, from the viewpoint of heat resistance and mechanical strength.

In the present disclosure, the term "(meth)acrylic" includes both "acrylic" and "methacrylic". The term "(meth) acrylate" includes both "acrylate" and "methacrylate".

A laminate including the resin film can be used as the first substrate. The laminate of the resin film can be produced by the use of, for example, a dry lamination method, a wet lamination method, or an extrusion method.

When the first substrate is a resin film, the resin film may be a stretched film or an unstretched film. The resin film is preferably uniaxially or biaxially stretched film from the viewpoint of strength.

The first substrate preferably has a thickness of 2 μm or more and 25 μm or less, more preferably 3 μm or more and 16 μm or less. This can result in good mechanical strength of the first substrate and good heat energy transfer during the thermal transfer.

(First Adhesive Layer)

The first adhesive layer is a layer to be transferred from the thermal transfer sheet by heating, and is, for example, a layer for forming an adhesive layer on the transfer layer included in an intermediate transfer medium. In the thermal transfer sheet of the present disclosure, the first adhesive layer contains a crystalline polyester. When the first adhesive layer contains the crystalline polyester, the primary transferability, the secondary transferability, and the adhesion between the transfer layer and the transfer-receiving article in the printed material can be improved.

In the present disclosure, the term "crystalline polyester" refers to a polyester exhibiting a clear melting peak in either of two temperature increase steps in a process in which the temperature is increased from −100° C. to 300° C. at 20° C./min, then decreased from 300° C. to −100° C. at 50° C./min, and subsequently increased from −100° C. to 300° C. at 20° C./min using a differential scanning calorimeter.

In the present disclosure, the term "polyester" means a polymer polymerized via ester bonds. Such a polyester is usually prepared by polycondensation of a dicarboxylic acid compound and a diol compound.

Examples of the dicarboxylic acid compound include malonic acid, succinic acid, glutaric acid, adipic acid, suberic acid, sebacic acid, dodecanedioic acid, eicosanedioic acid, pimelic acid, azelaic acid, methylmalonic acid, ethylmalonic acid, adamantanedicarboxylic acid, norbornenedicarboxylic acid, cyclohexanedicarboxylic acid, decalindicarboxylic acid, terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyl ether dicarboxylic acid, sodium 5-sulfoisophthalate, phenylendandicarboxylic acid, anthracenedicarboxylic acid, phenanthrenedicarboxylic acid, 9,9'-bis(4-carboxyphenyl)fluorene, and ester derivatives thereof.

Examples of the diol compound include ethylene glycol, 1,2-propanediol, 1,3-propanediol, butanediol, 2-methyl-1,3-propanediol, hexanediol, neopentylglycol, cyclohexanedimethanol, cyclohexanediethanol, decahydronaphthalenedimethanol, decahydronaphthalenediethanol, norbornanedimethanol, norbornanediethanol, tricyclodecanedimethanol, tricyclodecaneethanol, tetracyclododecanedimethanol, tetracyclododecanediethanol, decalindimethanol, decalindiethanol, 5-methylol-5-ethyl-2-(1,1-dimethyl-2-hydroxyethyl)-1,3-dioxane, cyclohexanediol, bicyclohexyl-4,4'-diol, 2,2-bis(4-hydroxycyclohexyl)propane, 2,2-bis(4-(2-hydroxyethoxy)cyclohexyl)propane, cyclopentanediol, 3-methyl-1,2-cyclopentadiol, 4-cyclopentene-1,3-diol, adamandiol, p-xylylene glycol, bisphenol A, bisphenol S, styrene glycol, trimethylolpropane, and pentaerythritol.

The polyester may contain a constituent unit originating from a polymerizable component other than the dicarboxylic acid compounds or the diol compounds. The percentage of the constituent unit is preferably 10% or less by mass, more preferably 5% or less by mass, even more preferably 3% or less by mass.

The crystalline polyester preferably has a number-average molecular weight (Mn) of 8,000 or more and 50,000 or less, more preferably 10,000 or more and 40,000 or less. This can further improve the primary transferability, the secondary transferability, and the adhesion between the transfer layer and the transfer-receiving article in a printed material.

In the present disclosure, Mn refers to a value measured by gel permeation chromatography using polystyrene as a standard material, and is measured by a method in accordance with JIS K 7252-3 (published in 2016).

The crystalline polyester preferably has a glass transition temperature (Tg) of −50° C. or higher and 50° C. or lower, more preferably −25° C. or higher and 20° C. or lower. This can further improve the primary transferability, the secondary transferability, and the adhesion between the transfer layer and the transfer-receiving article in a printed material.

In the present disclosure, Tg is a value determined by differential scanning calorimetry (DSC) in accordance with JIS K 7121.

The crystalline polyester preferably has a melting point (Tm) of 50° C. or higher and 150° C. or lower, more preferably 80° C. or higher and 120° C. or lower. This can further improve the primary transferability, the secondary transferability, and the adhesion between the transfer layer and the transfer-receiving article in a printed material.

In the present disclosure, Tm is a value determined in accordance with JIS K 7121 (published in 2012).

The crystalline polyester content is, for example, 3 parts by mass or more and 90 parts by mass or less, preferably 5 parts by mass or more and 90 parts by mass or less, more preferably 15 parts by mass or more and 80 parts by mass or less, even more preferably 25 parts by mass or more and 70 parts by mass or less, particularly preferably 40 parts by mass or more and 60 parts by mass or less, based on 100 parts by mass of the total amount of resin material contained in the first adhesive layer. This can further improve the primary transferability, the secondary transferability, and the adhesion between the transfer layer and the transfer-receiving article in a printed material while maintaining the blocking resistance.

The first adhesive layer may further contain a vinyl chloride-vinyl acetate copolymer. This can further improve the primary transferability, the secondary transferability, and the adhesion between the transfer layer and the transfer-receiving article in a printed material.

In the present disclosure, the term "vinyl chloride-vinyl acetate copolymer" refers to a copolymer of vinyl chloride and vinyl acetate. The vinyl chloride-vinyl acetate copolymer may contain, as a copolymerization component, a constituent unit originating from a compound other than vinyl chloride or vinyl acetate.

The percentage of the constituent unit originating from the compound other than vinyl chloride or vinyl acetate in the vinyl chloride-vinyl acetate copolymer is preferably 10% or less by mass, more preferably 5% or less by mass, even more preferably 3% or less by mass.

Mn of the vinyl chloride-vinyl acetate copolymer is preferably 5,000 or more and 30,000 or less, more preferably 10,000 or more and 20,000 or less. This can further improve the primary transferability, the secondary transferability, and the adhesion between the transfer layer and the transfer-receiving article in a printed material.

Tg of the vinyl chloride-vinyl acetate copolymer is preferably 50° C. or higher and 90° C. or lower, more preferably 60° C. or higher and 80° C. or lower. This can further improve the primary transferability, the secondary transferability, and the adhesion between the transfer layer and the transfer-receiving article in a printed material.

The vinyl chloride-vinyl acetate copolymer content is, for example, 10 parts by mass or more and 97 parts by mass or less, preferably 10 parts by mass or more and 95 parts by mass or less, more preferably 20 parts by mass or more and 85 parts by mass or less, even more preferably 30 parts by mass or more and 75 parts by mass or less, particularly preferably 40 parts by mass or more and 60 parts by mass or less, based on 100 parts by mass of the total amount of resin material contained in the first adhesive layer. This can further improve the primary transferability, the secondary transferability, and the adhesion between the transfer layer and the transfer-receiving article in a printed material while maintaining the blocking resistance.

In the present disclosure, the ratio of the vinyl chloride-vinyl acetate copolymer content to the crystalline polyester content of the first adhesive layer (vinyl chloride-vinyl acetate copolymer content/crystalline polyester content) is preferably ¼ or more and 19/1 or less, more preferably ¼ or more and 5/1 or less, even more preferably ⅓ or more and 4/1 or less, particularly preferably ½ or more and 3/1 or less, on a mass basis. This can further improve the primary transferability, the secondary transferability, and the adhesion between the transfer layer and the transfer-receiving article in a printed material.

The first adhesive layer may contain a resin material other than the crystalline polyester or the vinyl chloride-vinyl acetate copolymer. Examples of the resin material include polyolefins, vinyl resins, (meth)acrylic resins, imide resins, cellulosic resins, styrene resins, and ionomer resins.

The first adhesive layer preferably has a resin material content of 80% by mass or more, more preferably 85% by mass or more. In one embodiment, the first adhesive layer preferably has a resin material content of 80% by mass or more and 99.5% by mass or less, more preferably 85% by mass or more and 99% by mass or less. This can further improve the primary transferability, the secondary transferability, and the adhesion between the transfer layer and the transfer-receiving article in a printed material.

In one embodiment, the first adhesive layer further contains particles. This can improve the blocking resistance.

The particles may be organic particles, inorganic particles, or a combination of both. From the viewpoint of blocking resistance, organic particles are preferred.

Examples of the organic particles include particles (resin particles) comprising a resin, such as a melamine resin, a benzoguanamine resin, a (meth)acrylic resin, a polyamide, a fluororesin, a phenolic resin, a styrene resin, a polyolefin, a silicone resin, or a copolymer of monomers constituting these resins.

Examples of the inorganic particles include clay minerals, such as talc and kaoline; carbonates, such as calcium carbonate and magnesium carbonate; hydroxides, such as aluminum hydroxide and magnesium hydroxide; sulfates, such as calcium sulfate; oxides, such as silica; graphite; niter; and boron nitride.

The shape of the particles may be any of an irregular shape, a spherical shape, an elliptical shape, a cylindrical shape, a prismatic shape, and so forth. In addition, the surfaces of the particles may be treated with a surface treatment material, such as a silane coupling agent.

The average particle size of the particles is, for example, 0.1 μm or more and 10 μm or less, preferably 0.5 μm or more and 10 μm or less, more preferably 1 μm or more and 5 μm or less. This can improve the blocking resistance.

In the present disclosure, the average particle size means a volume-average particle size and is measured in accordance with JIS Z 8819-2.

The particle content is preferably 0.1 parts by mass or more and 20 parts by mass or less, more preferably 1 part by mass or more and 15 parts by mass or less, more preferably 5 parts by mass or more and 13 parts by mass or less, based on 100 parts by mass of the total amount of resin material contained in the first adhesive layer. This can further improve the blocking resistance while maintaining the primary transferability, the secondary transferability, and the adhesion between the transfer layer and the transfer-receiving article in a printed material.

The first adhesive layer may contain an additive. Examples of the additive include fillers, plasticizers, ultraviolet absorbers, and dispersants.

The first adhesive layer preferably has a thickness of 0.2 μm or more and 10 μm or less, more preferably 0.4 μm or more and 5 μm or less. This can further improve the primary transferability, the secondary transferability, and the adhesion between the transfer layer and the transfer-receiving article in a printed material.

The first adhesive layer can be formed by dispersing or dissolving the above-described material in an appropriate solvent to prepare a coating liquid, applying the coating liquid onto, for example, the first substrate, the second adhesive layer, or the release layer to form a coating film, and drying the coating film. As the application means, known means, such as a roll coating method, a reverse roll coating method, a gravure coating method, a reverse gravure coating method, a bar coating method, or a rod coating method, can be used.

(Second Adhesive Layer)

The thermal transfer sheet of the present disclosure may include a second adhesive layer between the first substrate and the first adhesive layer. The second adhesive layer is a layer to be transferred from the thermal transfer sheet by heating together with the first adhesive layer, and is, for example, a layer for forming an adhesive layer on the transfer layer included in the intermediate transfer medium. In the thermal transfer sheet of the present disclosure, the second adhesive layer contains an amorphous polyester.

When the thermal transfer sheet includes the second adhesive layer, the primary transferability, the secondary transferability, and the adhesion between the transfer layer and the transfer-receiving article in a printed material can be further improved.

In the present disclosure, the term "amorphous polyester" refers to a polyester that does not exhibit a clear melting peak in neither of two temperature increase steps in a process in which the temperature is increased from −100° C. to 300° C. at 20° C./min, then decreased from 300° C. to −100° C. at 50° C./min, and subsequently increased from −100° C. to 300° C. at 20° C./min using a differential scanning calorimeter.

Mn of the amorphous polyester is preferably 4,000 or more and 20,000 or less, more preferably 5,000 or more and 10,000 or less. This can further improve the primary transferability, the secondary transferability, and the adhesion between the transfer layer and the transfer-receiving article in a printed material.

Tg of the amorphous polyester is preferably 20° C. or higher and 80° C. or lower, more preferably 40° C. or higher and 70° C. or lower. This can further improve the primary transferability, the secondary transferability, and the adhesion between the transfer layer and the transfer-receiving article in a printed material.

The amorphous polyester content is preferably 50 parts by mass or more, more preferably 70 parts by mass or more, even more preferably 90 parts by mass or more, based on 100 parts by mass of the total amount of resin material contained in the second adhesive layer. This can further improve the primary transferability, the secondary transferability, and the adhesion between the transfer layer and the transfer-receiving article in a printed material.

The second adhesive layer may contain a resin material other than the amorphous polyester. Examples of the resin material include polyolefins, vinyl resins, (meth)acrylic resins, imide resins, cellulosic resins, styrene resins, and ionomer resins.

The second adhesive layer may contain the above-described additive.

The second adhesive layer preferably has a thickness of 0.2 μm or more and 10 μm or less, more preferably 0.4 μm or more and 5 μm or less. This can further improve the primary transferability, the secondary transferability, and the adhesion between the transfer layer and the transfer-receiving article in a printed material.

The second adhesive layer can be formed by dispersing or dissolving the above-described material in an appropriate solvent to prepare a coating liquid, applying the coating liquid onto, for example, the first substrate by the above-described application means to form a coating film, and drying the coating film.

(Release Layer)

The thermal transfer sheet of the present disclosure may include a release layer between the first substrate and at least one layer selected from the first adhesive layer, the second adhesive layer, and the coloring material layer. The release layer is a layer that remains on the first substrate at the time of thermal transfer of the thermal transfer sheet.

In one embodiment, the release layer contains at least one resin material. Examples of the resin material contained in the release layer include (meth)acrylic resins, polyurethanes, acetal resins, polyamides, polyesters, melamine resins, polyol resins, cellulosic resins, and silicone resins.

The release layer has a resin material content of, for example, 50% or more by mass and 99% or less by mass.

In one embodiment, the release layer contains at least one release material. Examples of the release material include fluorine compounds, phosphoric ester compounds, silicone oils, higher fatty acid amide compounds, metal soap, and waxes, such as paraffin wax.

The release layer preferably has a release material content of 0.1% or more by mass and 10% or less by mass, more preferably 0.5% or more by mass and 5% or less by mass. This can further improve the transferability of the first adhesive layer, the second adhesive layer, and the coloring material layer.

The release layer may contain the above-described additive.

The release layer has a thickness of, for example, 0.1 μm or more and 2.0 μm or less.

The release layer can be formed by dispersing or dissolving the above-described material in an appropriate solvent to prepare a coating liquid, applying the coating liquid onto, for example, the first substrate by the above-described application means to form a coating film, and drying the coating film.

(Coloring Material Layer)

The thermal transfer sheet of the present disclosure may include a coloring material layer in such a manner that the coloring material layer and the first adhesive layer are disposed as being frame sequentially on the same surface. When the thermal transfer sheet includes the second adhesive layer, the thermal transfer sheet may include the coloring material layer in such a manner that the coloring material layer, and the first adhesive layer and the second adhesive layer are disposed as being frame sequentially on the same surface. When the thermal transfer sheet includes the release layer, the thermal transfer sheet may include the coloring material layer in such a manner that the coloring material layer and the first adhesive layer are disposed as being frame sequentially on the same surface of the release layer.

As the coloring material layer, multiple coloring material layers may be disposed as being frame sequentially on the same surface.

The coloring material layer may be a sublimation transfer coloring material layer, in which only the sublimation dye contained in the coloring material layer is transferred, or may be a melt transfer coloring material layer, in which the coloring material layer itself is transferred. The thermal transfer sheet of the present disclosure may include both the sublimation transfer coloring material layer and the melt transfer coloring material layer.

The coloring material layer contains at least one coloring material. The coloring material contained in the coloring material layer may be a pigment or a dye. The dye may be a sublimation dye. The coloring material contained in the coloring material layer is preferably a pigment.

Examples of the coloring material include carbon black, acetylene black, lamp black, black smoke, iron black, aniline black, silica, calcium carbonate, titanium oxide, cadmium red, cadmopone red, chromium red, vermilion, colcothar, azo-based pigments, alizarin lake, quinacridone, cochineal lake perylene, yellow ocher, aureolin, cadmium yellow, cadmium orange, chromium yellow, zinc yellow, naples yellow, nickel yellow, azo-based pigments, greenish yellow, ultramarine, blue verditer, cobalt, phthalocyanine, anthraquinone, indigoid, cinnabar green, cadmium green, chromium green, phthalocyanine, azomethine, perylene, and aluminum pigments.

Examples of the dye include diarylmethane dyes, triarylmethane dyes, thiazole dyes, merocyanine dyes, pyrazolone dyes, methine dyes, indoaniline dyes, acetophenone azomethine dyes, pyrazolone azomethine dyes, xanthene dyes, oxazine dyes, thiazine dyes, azine dyes, acridine dyes, azo dyes, spiropyran dyes, indolinospiropyran dyes, fluoran dyes, naphthoquinone dyes, anthraquinone dyes, and quinophthalone dyes.

In one embodiment, the coloring material layer contains a resin material. Examples of the resin material contained in the coloring material layer include polyesters, polyamides, polyolefins, vinyl resins, vinyl acetal resins, (meth)acrylic resins, cellulosic resins, styrene resins, polycarbonates, phenoxy resins, and ionomer resins.

The coloring material layer preferably contains the same resin material as the resin material contained in the first adhesive layer. This can further improve the adhesion between the transfer layer and the transfer-receiving article in a printed material.

The coloring material layer may contain the above-described additive.

The coloring material layer has a thickness of, for example, 0.1 μm or more and 3 μm or less.

The coloring material layer can be formed by dispersing or dissolving the above-described material in an appropriate solvent to prepare a coating liquid, applying the coating liquid onto, for example, the first substrate or the release layer by the above-described application means to form a coating film, and drying the coating film.

(Back Layer)

The thermal transfer sheet of the present disclosure may include a back layer on a side of the first substrate opposite to the side on which the first adhesive layer is disposed. This can prevent the occurrence of sticking and wrinkling caused by heating during the thermal transfer.

In one embodiment, the back layer contains at least one resin material. Examples of the resin material contained in the back layer include vinyl resins, polyesters, polyamides, polyolefins, (meth)acrylic resins, polyolefins, polyurethanes, cellulosic resins, and phenolic resins.

In one embodiment, the back layer contains at least one isocyanate compound. Examples of the isocyanate composition include xylene diisocyanate, toluene diisocyanate, isophorone diisocyanate, and hexamethylene diisocyanate.

The back layer may contain the above-described release material and the above-described additive.

The back layer has a thickness of, for example, 0.01 μm or more and 3.0 μm or less.

The back layer can be formed by dispersing or dissolving the above-described material in an appropriate solvent to prepare a coating liquid, applying the coating liquid onto the first substrate by the above-described application means to form a coating film, and drying the coating film.

<Combination of Thermal Transfer Sheet and Intermediate Transfer Medium>

A combination of a thermal transfer sheet and an intermediate transfer medium according to the present disclosure is a combination of the thermal transfer sheet of the present disclosure and an intermediate transfer medium. In the combination of the present disclosure, the intermediate transfer medium includes at least a second substrate and a transfer layer including at least a receiving layer.

The combination of the thermal transfer sheet and the intermediate transfer medium of the present disclosure will be described below with reference to the drawings.

Figure 6:
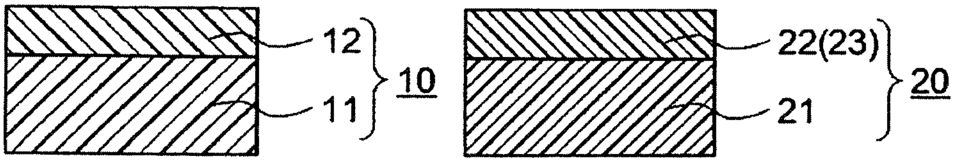
FIG. 6 is a schematic cross-sectional view illustrating a combination of a thermal transfer sheet and an intermediate transfer medium according to an embodiment of the present disclosure.

In one embodiment, as illustrated in FIG. 6, a combination of a thermal transfer sheet and an intermediate transfer medium includes the thermal transfer sheet 10 including the first substrate 11 and the first adhesive layer 12, and an intermediate transfer medium 20 including a second substrate 21 and a receiving layer 22 (transfer layer 23).

In one embodiment, the intermediate transfer medium 20 includes a release layer (not illustrated) between the second substrate 21 and the transfer layer 23.

In one embodiment, the transfer layer 23 of the intermediate transfer medium 20 includes a peeling layer and the receiving layer 22, and the peeling layer (not illustrated) is disposed between the second substrate 21 and the receiving layer 22.

In one embodiment, the transfer layer 23 of the intermediate transfer medium 20 includes a protective layer and the receiving layer 22, and the protective layer (not illustrated) is disposed between the second substrate 21 and the receiving layer 22.

In one embodiment, the transfer layer 23 of the intermediate transfer medium 20 includes, in sequence, a peeling layer, a protective layer, and the receiving layer 22, and the peeling layer and the protective layer (not illustrated) are disposed between the second substrate 21 and the receiving layer 22.

Each layer included in the intermediate transfer medium constituting the combination of the present disclosure will be described below. The thermal transfer sheet has been described above; thus, the description thereof is omitted here. The release layer that can be included in the intermediate transfer medium is the same as the release layer included in the thermal transfer sheet; thus, the description thereof will be omitted here.

(Second Substrate)

The second substrate can be used without limitation as long as it has heat resistance to thermal energy applied at the time of thermal transfer of the thermal transfer sheet, mechanical strength that can support, for example, the receiving layer disposed on the second substrate, and solvent resistance.

As the second substrate, a material that can be used for the first substrate can be appropriately selected and used.

The second substrate preferably has a thickness of 1 μm or more and 50 μm or less.

(Receiving Layer)

In the combination of the present disclosure, the transfer layer included in the intermediate transfer medium includes at least a receiving layer. The receiving layer is a layer to be transferred from the intermediate transfer medium onto the transfer-receiving article. The receiving layer contains at least one resin material. Examples of the resin material contained in the receiving layer include polyolefins, vinyl resins, such as poly(vinyl chloride) and vinyl chloride-vinyl acetate copolymers, (meth)acrylic resins, cellulosic resins, polyesters, polyamides, polycarbonates, styrene resins, epoxy resins, polyurethanes, and ionomer resins.

Among these, from the viewpoint of the adhesion between the receiving layer and the first adhesive layer, vinyl resins are preferred, and vinyl chloride-vinyl acetate copolymers are more preferred.

The receiving layer preferably has a resin material content of 80% by mass or more, more preferably 85% by mass or more. In one embodiment, the receiving layer preferably has a resin material content of 80% by mass or more and 99.5% by mass or less, more preferably 85% by mass or more and 99% by mass or less. This can further improve adhesion to the first adhesive layer.

The receiving layer may contain the above-described additive.

The receiving layer preferably has a thickness of 0.5 μm or more and 20 μm or less, more preferably 1 μm or more and 10 μm or less.

The receiving layer can be formed by dispersing or dissolving the above-described material in an appropriate solvent to prepare a coating liquid, applying the coating liquid onto, for example, the second substrate, the release layer, the peeling layer, or the protective layer by the above-described application means to form a coating film, and drying the coating film.

(Peeling Layer)

In the combination of the present disclosure, the transfer layer included in the intermediate transfer medium may include a peeling layer. The peeling layer is a layer that is to be transferred from the intermediate transfer medium to the transfer-receiving article, and is a layer that is to be located in the outermost surface of the printed material.

The peeling layer contains at least one resin material. Examples of the resin material contained in the peeling layer include polyesters, polyamides, polyolefins, vinyl resins, (meth)acrylic resins, imide resins, cellulosic resins, styrene resins, polycarbonates, and ionomer resins.

The peeling layer may contain the above-described release material and the above-described additive.

The peeling layer can be formed by dispersing or dissolving the above-described material in an appropriate solvent to prepare a coating liquid, applying the coating liquid onto, for example, the second substrate by the above-described application means to form a coating film, and drying the coating film.

(Protective Layer)

In the combination of the present disclosure, the transfer layer included in the intermediate transfer medium may include a protective layer.

The protective layer contains at least one resin material. Examples of the resin material contained in the protective layer include polyesters, (meth)acrylic resins, epoxy resins, styrene resins, acrylic polyol resins, polyurethanes, ionizing radiation-curable resins, and ultraviolet-absorbing resins.

The protective layer may contain the above-described additive.

The protective layer preferably has a thickness of 0.5 μm or more and 7 μm or less, more preferably 1 μm or more and 5 μm or less. This can further improve the durability of the protective layer.

The protective layer can be formed by dispersing or dissolving the above-described material in an appropriate solvent to prepare a coating liquid, applying the coating liquid onto, for example, the second substrate, the release layer, or the peeling layer by the above-described application means to form a coating film, and drying the coating film.

<Printed Material>

A printed material according to the present disclosure is produced by using the combination of the thermal transfer sheet of the present disclosure and the intermediate transfer medium.

In one embodiment, the printed material of the present disclosure includes, in sequence, the transfer-receiving article, the first adhesive layer, an image formed on the receiving layer, and the transfer layer including at least the receiving layer, in which the image and the transfer-receiving article are in contact with the first adhesive layer.

In one embodiment, the printed material of the present disclosure includes, in sequence, the transfer-receiving article, the second adhesive layer, the first adhesive layer, an image formed on the receiving layer, and the transfer layer including at least the receiving layer, in which the image is in contact with the first adhesive layer, and the transfer-receiving article is in contact with the second adhesive layer.

The printed material of the present disclosure will be described below with reference to the drawings.

Figure 7:
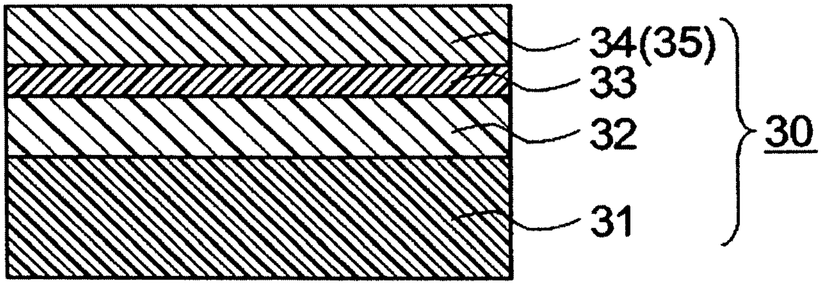
FIG. 7 is a schematic cross-sectional view illustrating a printed material according to an embodiment of the present disclosure.

In one embodiment, as illustrated in FIG. 7, a printed material 30 includes, in sequence, a transfer-receiving article 31, a first adhesive layer 32, an image 33, and a receiving layer 34 (transfer layer 35), in which the image 33 and the transfer-receiving article 31 are in contact with the first adhesive layer 32.

Figure 8:
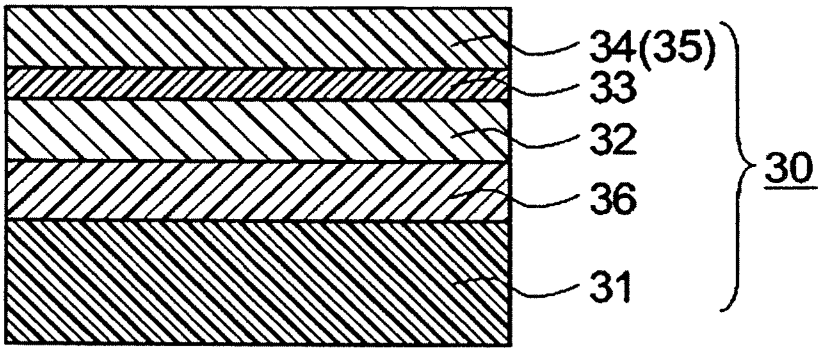
FIG. 8 is a schematic cross-sectional view illustrating a printed material according to an embodiment of the present disclosure.

In one embodiment, as illustrated in FIG. 8, the printed material 30 includes, in sequence, the transfer-receiving article 31, a second adhesive layer 36, the first adhesive layer 32, the image 33, and the receiving layer 34 (transfer layer 35), in which the image 33 is in contact with the first adhesive layer 32, and the transfer-receiving article 31 is in contact with the second adhesive layer 36.

In one embodiment, the transfer layer 35 of the printed material 30 includes the receiving layer 34 and a peeling layer, in which the peeling layer (not illustrated) is disposed in the outermost surface of the printed material 30.

In one embodiment, the transfer layer 35 of the printed material 30 includes the receiving layer 34 and a protective layer, in which the protective layer (not illustrated) is disposed on a side of the receiving layer 34 opposite to the side on which the image 33 is disposed.

In one embodiment, the transfer layer 35 of the printed material 30 includes, in sequence, the receiving layer 34, the protective layer, and the peeling layer, in which the peeling layer and the protective layer (not illustrated) are disposed on a side of the receiving layer 34 opposite to the side on which the image 33 is disposed, and the peeling layer is disposed in the outermost surface of the printed material.

The transfer-receiving article and the image included in the printed material according to the present disclosure will be described below. The thermal transfer sheet and the intermediate transfer medium have been described above; thus, the description thereof is omitted here. The first adhesive layer, the second adhesive layer, the receiving layer, the peeling layer, and the protective layer that can be included in the printed material are the same as those included in the thermal transfer sheet or the intermediate transfer medium; thus, the description thereof will be omitted here.

(Transfer-Receiving Article)

The transfer-receiving article included in the printed material is not particularly limited. Examples of the transfer-receiving article include paper substrates, such as woodfree paper, art paper, coated paper, resin-coated paper, cast coated paper, paper board, synthetic paper, and impregnated paper, the above-described resin films, and laminates thereof.

From the viewpoints of heat resistance and durability of the printed material, the transfer-receiving article is preferably a resin substrate comprising a polycarbonate.

The transfer-receiving article has a thickness of, for example, 0.1 mm or more and 2 mm or less.

(Image)

In the printed material of the present disclosure, an image is formed on the receiving layer. Examples of the image include photographs, characters, patterns, symbols, and combinations thereof.

<Method for Producing Printed Material>

In one embodiment, a method for producing the printed material of the present disclosure includes the steps of:

- providing the combination of the thermal transfer sheet of the present disclosure and the intermediate transfer medium;
- forming the image on the receiving layer of the intermediate transfer medium;
- transferring the first adhesive layer from the thermal transfer sheet onto the image; and
- transferring the transfer layer, the image, and the first adhesive layer from the intermediate transfer medium onto the transfer-receiving article.

In one embodiment, a method for producing the printed material of the present disclosure includes the steps of:

- providing the combination of the thermal transfer sheet of the present disclosure and the intermediate transfer medium;
- forming the image on the receiving layer of the intermediate transfer medium;
- transferring the first adhesive layer and the second adhesive layer from the thermal transfer sheet onto the image; and
- transferring the transfer layer, the image, the first adhesive layer, and the second adhesive layer from the intermediate transfer medium onto the transfer-receiving article.

The steps included in the method for producing the printed material of the present disclosure will be described below.

(Step of Providing Thermal Transfer Sheet and Intermediate Transfer Medium)

The method for producing the printed material of the present disclosure includes the step of providing the thermal transfer sheet and the intermediate transfer medium. Methods for producing the thermal transfer sheet and the intermediate transfer medium have been described above; thus, the description thereof is omitted here.

(Step of Forming Image)

The method for producing the printed material of the present disclosure includes the step of forming the image on the receiving layer included in the intermediate transfer medium. The image formation may be performed by using the above-described thermal transfer sheet, or may be performed by using a thermal transfer sheet different from the above-described thermal transfer sheet. For the image formation, the coloring material layer included in the above-described thermal transfer sheet may be used, or, for example, a thermal transfer sheet including a coloring material layer may be separately used.

The image formation can be performed by a conventionally known method with, for example, a commercially available thermal transfer printer.

(Step of Transfer onto Image)

The method for producing the printed material of the present disclosure includes the step of transferring the first adhesive layer from the thermal transfer sheet onto the image, or the step of transferring the first adhesive layer and the second adhesive layer from the thermal transfer sheet onto the image.

The transfer can be performed by a conventionally known method with, for example, a commercially available thermal transfer printer.

The thermal transfer sheet is as described above.

In the step of transfer onto the image, the transfer temperature is preferably 100° C. or higher and 140° C. or lower, more preferably 110° C. or higher and 130° C. or lower.

(Step of Transfer onto Transfer-Receiving Article)

The method for producing the printed material of the present disclosure includes the step of transferring the transfer layer, the image formed on the receiving layer included in the transfer layer, and the first adhesive layer from the intermediate transfer medium onto the transfer-receiving article, or the step of transferring the transfer layer, the image formed on the receiving layer included in the transfer layer, the first adhesive layer, and the second adhesive layer from the intermediate transfer medium onto the transfer-receiving article.

The transfer can be performed by a conventionally known method with, for example, a commercially available thermal transfer printer.

The transfer-receiving article and the intermediate transfer medium are as described above.

In the step of transfer onto the transfer-receiving article, the transfer temperature is preferably 90° C. or higher and 160° C. or lower, more preferably 110° C. or higher and 130° C. or lower. This can suppress the occurrence of warpage in the transfer-receiving article.

Embodiments of the thermal transfer sheet, the combination of the thermal transfer sheet and the intermediate transfer medium, the printed material, and the method for producing the printed material according to the present disclosure will be described below. The thermal transfer sheet, the combination of the thermal transfer sheet and the intermediate transfer medium, the printed material, and the method for producing the printed material according to the present disclosure are not limited to these embodiments.

In the present disclosure, a thermal transfer sheet including a first substrate and a first adhesive layer is provided, in which the first adhesive layer is a layer to be transferred from the thermal transfer sheet by heating, and the first adhesive layer contains a crystalline polyester.

In one embodiment, the first adhesive layer further contains a vinyl chloride-vinyl acetate copolymer.

In one embodiment, the ratio of the amount of the vinyl chloride-vinyl acetate copolymer contained to the amount of the crystalline polyester contained in the first adhesive layer (the amount of the vinyl chloride-vinyl acetate copolymer contained/the amount of the crystalline polyester contained) is ¼ or more and 19/1 or less on a mass basis.

In one embodiment, the crystalline polyester has a glass transition temperature of −50° C. or higher and 50° C. or lower.

In one embodiment, the crystalline polyester has a melting point of 50° C. or higher and 150° C. or lower.

In one embodiment, the crystalline polyester has a number-average molecular weight of 8,000 or more and 50,000 or less.

In one embodiment, the first adhesive layer further contains a particle.

In one embodiment, the thermal transfer sheet further includes a coloring material layer, in which the coloring material layer and the first adhesive layer are disposed as being frame sequentially on the same surface.

In one embodiment, a coloring material of the coloring material layer is a pigment.

In one embodiment, the thermal transfer sheet includes a second adhesive layer between the first substrate and the first adhesive layer, the first adhesive layer and the second adhesive layer are layers to be transferred from the thermal transfer sheet by heating, and the second adhesive layer contains an amorphous polyester.

In the present disclosure, a combination of the above-described thermal transfer sheet and an intermediate transfer medium is provided, in which the intermediate transfer medium includes a second substrate and a transfer layer including at least a receiving layer.

In one embodiment, the receiving layer contains a vinyl chloride-vinyl acetate copolymer.

In the present disclosure, a printed material produced by using a combination of the thermal transfer sheet described above and an intermediate transfer medium is provided, in which the intermediate transfer medium includes a second substrate and a transfer layer including at least a receiving layer, the printed material includes, in sequence, the transfer layer, an image formed on the receiving layer, the first adhesive layer, and a transfer-receiving article, and the image and the transfer-receiving article are in contact with the first adhesive layer.

In the present disclosure, a method for producing the above-described printed material is provided, the method including the steps of:

providing the combination of the thermal transfer sheet and the intermediate transfer medium;

forming the image on the receiving layer of the intermediate transfer medium;

transferring the first adhesive layer from the thermal transfer sheet onto the image; and transferring the transfer layer, the image, and the first adhesive layer from the intermediate transfer medium onto the transfer-receiving article.

In the present disclosure, a printed material produced by using a combination of the thermal transfer sheet described above and an intermediate transfer medium is provided, in which the intermediate transfer medium includes a second substrate and a transfer layer including at least a receiving layer, the printed material includes, in sequence, the transfer layer, an image formed on the receiving layer, the first adhesive layer, the second adhesive layer, and a transfer-receiving article, and the image is in contact with the first adhesive layer, and the transfer-receiving article is in contact with the second adhesive layer.

In the present disclosure, a method for producing the printed material is provided, the method including the steps of:

providing the combination of the thermal transfer sheet and the intermediate transfer medium;

forming the image on the receiving layer of the intermediate transfer medium;

transferring the first adhesive layer and the second adhesive layer from the thermal transfer sheet onto the image; and transferring the transfer layer, the image, the first adhesive layer, and the second adhesive layer from the intermediate transfer medium onto the transfer-receiving article.

EXAMPLES

While the present disclosure will be described in more detail below with reference to examples, the present disclosure is not limited to these examples. Hereinafter, with respect to a material in which a solid content is expressed, a content before solid content conversion is described.

Example 1

As a first substrate, a PET film having a thickness of 4.5 μm was provided. A coating liquid, having the following composition, for a second adhesive layer was applied to one surface of the PET film and dried to form a second adhesive layer having a thickness of 1 μm.

| <Coating Liquid for Second Adhesive Layer> | |
|---|---|
| Amorphous polyester A<br>(Elitel (registered trademark) UE3380, Tg: 60° C., Mn: 8,000, available from Unitika Ltd.) | 10 parts by mass |
| Methyl ethyl ketone (MEK) | 25 parts by mass |
| Toluene | 25 parts by mass |

Next, a coating liquid, having the following composition, for a first adhesive layer was applied to the second adhesive layer and dried to form a first adhesive layer having a thickness of 0.8 μm.

| <Coating Liquid for First Adhesive Layer> | |
|---|---|
| Crystalline polyester A<br>(Vylon (registered trademark) GA-6400, Tg: −20° C., Tm: 96° C., Mn: 30,000, available from Toyobo Co., Ltd.) | 10 parts by mass |
| Vinyl chloride-vinyl acetate copolymer<br>(Solbin (registered trademark) CNL, Tg: 76° C., Mn: 16,000, available from Nissin Chemical Industry Co., Ltd.) | 90 parts by mass |
| MEK | 250 parts by mass |
| Toluene | 250 parts by mass |

A coating liquid, having the following composition, for a back layer was applied to a surface of the PET film opposite to the surface on which the adhesive layer was formed and dried to form a back layer having a thickness of 0.06 μm, thereby providing a thermal transfer sheet.

| <Coating Liquid for Back Layer> | |
|---|---|
| Acrylic-modified silicone resin<br>(Polyalloy NSA-X55, available from Natoco Co., Ltd.) | 10 parts by mass |
| MEK | 20 parts by mass |

Examples 2 to 9, 11, and 12 and Comparative Examples 1 to 6

A thermal transfer sheet was produced as in Example 1, except that the configuration of the layers constituting the thermal transfer sheet was changed as given in Table 1. In each of the thermal transfer sheets of Comparative examples 1 and 2, the second adhesive layer was not formed on the first substrate.

Crystalline polyester B: Nichigo-Polyester SP-180, Tg: 10° C., Tm: 110° C., Mn: 10,000, available from Mitsubishi Chemical Corporation)

Amorphous polyester B: Vylon (registered trademark) GK780, Tg: 36° C., Mn: 11,000, available from Toyobo Co., Ltd.)

Amorphous polyester C: Vylon (registered trademark) 200, Tg: 67° C., Mn: 17,000, available from Toyobo Co., Ltd.)

Ethylene-vinyl acetate copolymer: EVA220 (described as EVA in Table 1), available from Du Pont-Mitsui Chemicals Co., Ltd.)

(Meth)acrylic resin: Dianal (registered trademark) BR-87, available from Mitsubishi Chemical Corporation)

Organic particles: Epostar (registered trademark) S6, average particle size: 0.4 μm, melamine-formaldehyde condensate, available from Nippon Shokubai Co., Ltd.

Example 10

A coating liquid, having the following composition, for a release layer was applied to one surface of a PET film having a thickness of 4.5 μm and dried to form a release layer having a thickness of 0.1 μm.

| <Coating Liquid for Release Layer> | |
|---|---|
| Acrylic silicone graft polymer<br>(Cymac (registered trademark) US350, available from Toagosei Co., Ltd.) | 10 parts by mass |
| MEK | 20 parts by mass |
| Toluene | 20 parts by mass |

A first adhesive layer was formed on the release layer in the same manner as in Example 7 to provide a thermal transfer sheet of Example 10.

[Production of Intermediate Transfer Medium]

A PET film having a thickness of 12 μm was provided as a second substrate. A coating liquid, having the following composition, for a peeling layer was applied to one surface of the PET film and dried to form a peeling layer having a thickness of 1.6 μm. A coating liquid, having the following composition, for a protective layer was applied onto the peeling layer and dried to form a protective layer having a thickness of 4 μm. A coating liquid, having the following composition, for a receiving layer was applied onto the protective layer and dried to form a receiving layer having a thickness of 1 μm, thereby providing an intermediate transfer medium. The peeling layer, the protective layer, and the receiving layer constitute a transfer layer of the intermediate transfer medium.

| <Coating Liquid for Peeling Layer> | |
|---|---|
| (Meth)acrylic resin<br>(Dianal (registered trademark) BR-87, available from Mitsubish Chemical Corporation) | 95 parts by mass |
| Polyester<br>(Vylon (registered trademark) 200, available from Toyobo Co., Ltd.) | 5 parts by mass |
| MEA | 300 parts by mass |
| Toluene | 300 parts by mass |

| <Coating Liquid for Protective Layer> | |
|---|---|
| Polyester<br>(Elitel (registered trademark) UE-9885, available from Unitika Ltd.) | 20 parts by mass |
| MEK | 40 parts by mass |
| Toluene | 40 parts by mass |

| <Coating Liquid for Receiving Layer> | |
|---|---|
| Vinyl chloride-vinyl acetate copolymer<br>(Solbin (registered trademark) CNL, Tg: 76° C., Min: 16,000, available from Nissin Chemical Industry Co., Ltd.) | 95 parts by mass |
| Toluene | 200 parts by mass |
| MEK | 200 parts by mass |

«Evaluation of Primary Transferability»

Retransfer color ribbons (genuine color ribbons for CR805, available from Datacard Japan Ltd.) in which adhesive layer panel regions were replaced with the thermal transfer sheets obtained in Examples and Comparative examples, the above intermediate transfer media, and a printer (CR805, available from Datacard Japan Ltd.) were provided. The coloring material layer of each of the retransfer color ribbons was of a melt transfer type.

Using the above printer, a half-gray solid image of 128/255 gradation was formed on the receiving layer (transfer layer) of each intermediate transfer medium using the coloring material layer of the retransfer color ribbon. Subsequently, the first adhesive layer and/or the second adhesive layer of the thermal transfer sheet were primarily transferred onto the image.

The transfer region of the used thermal transfer sheet (the remaining first substrate side) was visually observed, and whether the first adhesive layer and/or the second adhesive layer was transferred onto the receiving layer was evaluated based on the following evaluation criteria. Table 1 presents the evaluation results.

(Evaluation Criteria)

A: No adhesive layer remained in the transfer region of the used thermal transfer sheet.

(The adhesive layer was transferred to the entire surface of the receiving layer.)

B: The adhesive layer partially remained in the transfer region of the used thermal transfer sheet.

(There were some regions where the adhesive layer was not transferred onto the receiving layer.)

C: Half or more of the adhesive layer remained in the transfer region of the used thermal transfer sheet.

(The adhesive layer was not transferred to half or more of the region on the receiving layer.)

«Evaluation of Secondary Transferability»

The intermediate transfer medium including the first adhesive layer and/or the second adhesive layer on the transfer layer obtained in the evaluation of primary transferability, a polycarbonate card, and the above-described printer were provided.

The transfer layer of the intermediate transfer medium and the first adhesive layer and/or the second adhesive layer were secondarily transferred onto the polycarbonate card to produce a printed material.

In Comparative example 7, the primary transfer was not performed, and only the transfer layer of the intermediate transfer medium was transferred onto the polycarbonate card to produce a printed material.

The resulting printed material was visually observed and evaluated based on the following evaluation criteria. Table 1 presents the evaluation results.

(Evaluation Criteria)

A: 100% of the region is transferred.

B: 80% or more and less than 100% of the region is transferred.

C: 40% or more and less than 80% of the region is transferred.

D: 0% or more and less than 40% of the region is transferred.

«Evaluation of Adhesion»

The printed material obtained in the evaluation of secondary transferability was subjected to a tape adhesion test based on Cross-Hatch Tape Test (INCITS ANSI 322:2008 Sec. 5.3). The printed material after the test was visually observed and evaluated based on the following evaluation criteria. Table 1 presents the evaluation results.

(Evaluation Criteria)

A: The edge of the cut was smooth, and no peeling occurred in any cell of the grid.

B: Small peeling of the image occurred at the intersection points (cross-cut portions) of the cuts.

C: Small peeling of the image occurred at the edges of the cuts and at the cross-cut portions.

D: Large peeling of the image occurred at the edges of the cuts and the cross-cut portions, and the cells of the grid were partially peeled off.

E: Large peeling of the image occurred at the edges of the cuts and at the cross-cut portions, and the cells of the grid were mostly peeled off.

«Evaluation of Blocking Resistance»

The thermal transfer sheet (length: 25 m) obtained in each of Examples and Comparative examples was wound around a core having an outside diameter of 25 mm until the outside diameter after winding reached 35 mm. Then, the thermal transfer sheet was allowed to stand in an environment of 50° C. for 100 hours. After the standing, the thermal transfer sheet was unwound, and the ease of unwinding was evaluated based on the following evaluation criteria. Table 1 presents the evaluation results.

(Evaluation Criteria)

A: The sheet can be smoothly unwound without adhesion.

B: The sheet has slight adhesion but can be smoothly unwound.

C: The sheet partially has light adhesion and is caught when being unwound.

TABLE 1

| | Type of resin material contained in first adhesive layer, and content based on total amount of resin material that can be contained in first adhesive layer (parts by mass) | | | | | | | |
|---|---|---|---|---|---|---|---|---|
| | Crystalline polyester A (Mn: 30,000, Tg: −20° C., Tm: 96° C.) | Crystalline polyester B (Mn: 10,000, Tg: 10° C., Tm: 110° C.) | Vinyl chloride-vinyl acetate copolymer | Amorphous polyester A | Amorphous polyester B | Amorphous polyester C | EVA | (Meth)acrylic resin |
| Example 1 | 10 | | 90 | | | | | |
| Example 2 | 20 | | 80 | | | | | |
| Example 3 | 30 | | 70 | | | | | |
| Example 4 | 50 | | 50 | | | | | |
| Example 5 | | 20 | 80 | | | | | |
| Example 6 | | 30 | 70 | | | | | |
| Example 7 | | 50 | 50 | | | | | |
| Example 8 | | 70 | 30 | | | | | |
| Example 9 | | 50 | 50 | | | | | |
| Example 10 | | 50 | 50 | | | | | |
| Example 11 | 3 | | 97 | | | | | |
| Example 12 | 90 | | 10 | | | | | |
| Comparative example 1 | | | | 100 | | | | |
| Comparative examole 2 | | | | | 100 | | | |
| Comparative example 3 | | | 100 | | | | | |
| Comparative example 4 | | | 50 | | | 50 | | |
| Comparative example 5 | | | 50 | | | | 50 | |
| Comparative example 6 | | | 50 | | | | | 50 |
| Comparative example 7 | | | | | | | | |

| | Organic particle content based on total amount of resin material contained in the first adhesive layer (parts by mass) | Primary transferability | Secondary transferability | Adhesion | Blocking resistance |
|---|---|---|---|---|---|
| Example 1 | | B | B | C | A |
| Example 2 | | B | B | B | A |
| Example 3 | | B | B | A | A |
| Example 4 | | A | A | A | B |
| Example 5 | | B | B | B | A |
| Example 6 | | B | B | A | A |
| Example 7 | | A | A | A | B |
| Example 8 | | A | A | A | C |
| Example 9 | 10 | A | A | A | A |
| Example 10 | | B | B | A | B |
| Example 11 | | C | C | C | A |
| Example 12 | | A | A | A | C |
| Comparative example 1 | | C | C | D | A |
| Comparative examole 2 | | C | C | D | A |
| Comparative example 3 | | B | B | D | A |
| Comparative example 4 | | B | B | D | A |
| Comparative example 5 | | B | B | D | A |
| Comparative example 6 | | B | B | D | A |
| Comparative example 7 | | — | D | E | — |

It should be understood by those skilled in the art that the thermal transfer sheet and the like of the present disclosure are not limited by the description of the above examples, but the above examples and specification are merely for illustrating the principle of the present disclosure, and various modifications or improvements can be made without departing from the spirit and scope of the present disclosure, and all of these modifications or improvements fall within the scope of the present disclosure as claimed. Furthermore, the scope of protection claimed by the present disclosure includes not only the description of the claims but also the equivalents thereof.

REFERENCE SIGNS LIST

10 thermal transfer sheet
11 first substrate
12 first adhesive layer
13 second adhesive layer
14 release layer
15 coloring material layer
20 intermediate transfer medium
21 second substrate
22 receiving layer
23 transfer layer
30 printed material
31 transfer-receiving article
32 first adhesive layer
33 image
34 receiving layer
35 transfer layer
36 second adhesive layer

The invention claimed is:

1. A thermal transfer sheet, comprising:
a first substrate;
a first adhesive layer; and
a second adhesive layer between the first substrate and the first adhesive layer,
wherein the first adhesive layer and the second adhesive layer are layers to be transferred from the thermal transfer sheet by heating,
wherein the first adhesive layer contains a crystalline polyester and a vinyl chloride-vinyl acetate copolymer,
wherein a ratio of an amount of the vinyl chloride-vinyl acetate copolymer contained to an amount of the crystalline polyester contained in the first adhesive layer (the amount of the vinyl chloride-vinyl acetate copolymer contained/the amount of the crystalline polyester contained) is 70/30 or more and 97/3 or less on a mass basis, and
wherein the second adhesive layer contains an amorphous polyester.

2. The thermal transfer sheet according to claim 1, wherein the crystalline polyester has a glass transition temperature of −50° C. or higher and 50° C. or lower.

3. The thermal transfer sheet according to claim 1, wherein the crystalline polyester has a melting point of 50° C. or higher and 150° C. or lower.

4. The thermal transfer sheet according to claim 1, wherein the crystalline polyester has a number-average molecular weight of 8,000 or more and 50,000 or less.

5. The thermal transfer sheet according to claim 1, wherein the first adhesive layer further contains a particle.

6. The thermal transfer sheet according to claim 1, wherein the thermal transfer sheet further comprises a coloring material layer,
wherein the coloring material layer and the first adhesive layer are disposed as being frame sequentially on one surface.

7. The thermal transfer sheet according to claim 6, wherein a coloring material of the coloring material layer is a pigment.

8. A combination of the thermal transfer sheet according to claim 1 and an intermediate transfer medium,
wherein the intermediate transfer medium comprises a second substrate and a transfer layer comprising at least a receiving layer.

9. The combination of the thermal transfer sheet and the intermediate transfer medium according to claim 8, wherein the receiving layer contains a vinyl chloride-vinyl acetate copolymer.

10. A method for producing a printed material, comprising the steps of:
providing a combination of the thermal transfer sheet according to claim 1 and an intermediate transfer medium comprising a second substrate and a transfer layer comprising at least a receiving layer;
forming an image on the receiving layer of the intermediate transfer medium;
transferring the first adhesive layer from the thermal transfer sheet onto the image; and
transferring the transfer layer, the image, and the first adhesive layer from the intermediate transfer medium onto a transfer-receiving article,
wherein the printed material comprises, in sequence, the transfer-receiving article, the first adhesive layer, the image formed on the receiving layer, and the transfer layer, and the image and the transfer-receiving article are in contact with the first adhesive layer.

11. A method for producing a printed material, comprising the steps of:
providing a combination of the thermal transfer sheet according to claim 1 and an intermediate transfer medium comprising a second substrate and a transfer layer comprising at least a receiving layer;
forming an image on the receiving layer of the intermediate transfer medium;
transferring the first adhesive layer and the second adhesive layer from the thermal transfer sheet onto the image; and
transferring the transfer layer, the image, the first adhesive layer, and the second adhesive layer from the intermediate transfer medium onto a transfer-receiving article,
wherein the printed material comprises, in sequence, the transfer-receiving article, the second adhesive layer, the first adhesive layer, the image formed on the receiving layer, and the transfer layer, and the image is in contact with the first adhesive layer, and the transfer-receiving article is in contact with the second adhesive layer.

* * * * *